United States Patent [19]

Trah et al.

[11] Patent Number: 5,595,940
[45] Date of Patent: Jan. 21, 1997

[54] METHOD OF PRODUCING MICROMECHANICAL STRUCTURES

[75] Inventors: Hans-Peter Trah, Reutlingen; Franz Laermer, Stuttgart; Andrea Schilp, Gmuend, all of Germany

[73] Assignee: Robert Bosch GmbH, Stuttgart, Germany

[21] Appl. No.: 446,271

[22] Filed: May 22, 1995

[30] Foreign Application Priority Data

May 25, 1994 [DE] Germany ............................ 44 18 163.9

[51] Int. Cl.⁶ .................................................. H01L 21/302
[52] U.S. Cl. .......................... 437/225; 437/228; 437/921; 216/2
[58] Field of Search ..................... 437/225, 228, 437/901, 921; 216/2; 731/504.14, 504.16, 514.35, 514.36; 252/415, 417

[56] References Cited

U.S. PATENT DOCUMENTS

| | | | |
|---|---|---|---|
| 5,189,777 | 3/1993 | Guckel et al. | 29/424 |
| 5,194,402 | 3/1993 | Ehrfeld et al. | 437/180 |
| 5,216,490 | 6/1993 | Greiff et al. | 73/514.35 |
| 5,296,730 | 3/1994 | Tokono et al. | 257/417 |
| 5,349,855 | 9/1994 | Bernstein et al. | 73/504.16 |

FOREIGN PATENT DOCUMENTS 05102494  4/1993  Japan .

OTHER PUBLICATIONS

Tobata et al, "Monolithic Pressure Flow Sensor", IEEE Trans. on Elec. Dev., vol. ED–34, No. 12, Dec. 1987, pp. 2456–2462.

Petersen et al, "Micromechanical Accelerometer Integrated with MOS Detection Circuitry", IEEE Trans. on Elec. Dev., vol. ED–29, No. 1, Jan. 1982, pp. 23–27.

Primary Examiner—George Fourson
Assistant Examiner—Thomas G. Bilodeau
Attorney, Agent, or Firm—Kenyon & Kenyon

[57] ABSTRACT

In a method of producing micromechanical structures on semiconductor components, in particular on the surface of a wafer containing integrated circuits, provision is made for the micromechanical structures to be provided subsequently on a fully processed semiconductor component using process steps which are normally applied in semiconductor component production and are at most slightly modified, but independently of the semiconductor component production process.

9 Claims, 2 Drawing Sheets

METHOD OF PRODUCING MICROMECHANICAL STRUCTURES

FIELD OF THE INVENTION

The present invention relates to a method of producing micromechanical structures.

BACKGROUND INFORMATION

It is known to provide micromechanical structures on the surface of semiconductor components, for example of silicon wafers containing integrated circuits (ICs). These may be freely moving sensor elements constructed as capacitive acceleration sensors which comprise a resiliently suspended seismic mass and also a comb-structure system for capacitively evaluating the deflections of the seismic mass associated with acceleration.

To form such components with micromechanical structure, the conventional methods of surface micromechanics utilize, for example, sacrificial layers integrated in the wafer structure and active silicon layers situated on top thereof and composed, for example, of polysilicon on top of silicon oxide islands, with the result that a massive intervention has to be made in the IC process.

According to a further known production method, these sensor elements are formed with the aid of the LIGA technology in electrodeposited metal layers. In the LIGA method, high X-ray resist structures produced by synchrotron exposure are formed by electroplating, and a first mold is first obtained therefrom. The mold is then used to imprint under high pressure polymer layers which are provided on wafers and which consequently yield a female mold which is then filled by electroplating. The polymer mold is then destroyed so that the sensor element is laid bare. A disadvantage of this process is that a synchrotron exposure can be carried out only with high and consequently expensive effort using additional synchrotron installations which are not a common manufacturing feature of semiconductor component production. As a result of the high molding pressures during the molding of the female structures, there is furthermore the risk of destroying the wafer, the mold or electronic circuits integrated in the wafer. During the molding of the sensor elements, a precise alignment with the circuits contained on the wafers also presents problems. As a result of wear of the mold, it is necessary to produce a plurality of daughter modes by remolding before the actual production of the sensor elements can take place.

Hitherto it has not yet been possible in practice to demonstrate the serviceability of the process as a whole. The molding on an IC wafer is always a dangerous intervention in the IC process.

SUMMARY OF THE INVENTION

The method according to the present invention offers the advantage that the production of the micromechanical structures does not depend on the process of producing the semiconductor components containing the integrated circuits and does not impose any additional boundary conditions on the latter. The electronics section and the sensor section formed by the micromechanical structures are decoupled from one another in process engineering terms, with the result that further developments of each section can be pursued independently of one another. A mutual additional development effort to adapt a new electronics section to a new sensor section and vice versa is not necessary. The sensor section can consequently be combined with the most modern, most advanced process for producing integrated circuits in each case without a time delay.

In contrast to the LIGA method, which is also an additive technology per se, only standard installations and processes of IC technology are used and dangerous process steps having a high risk of rejection, such as the molding, are avoided. The use of additional steps in the method which are completely foreign to the production of semiconductor components is consequently avoided. It is furthermore possible to arrange sensor structures on top of active IC areas and consequently to achieve a multiple usage of the chip areas. In principle, the sensor does not therefore require any additional area since it is located on top of a section of the area of the electronic circuit.

A further advantage is that all the process steps for producing the micromechanical structures are compatible with the semiconductor components already present, that is to say, in particular, they proceed at low temperatures up to approximately 200° C. The subsequent mounting of micromechanical structures on fully processed semiconductor components containing integrated circuits is consequently possible. There is no effect on the integrated circuits, as in the known production methods. In addition, a precise alignment of the micromechanical structures with the contact areas of the integrated circuits can easily be carried out by means of the steps in the method, with the result that the structures can be coupled with very high precision.

The method according to the invention offers a substantially wider design freedom than the LIGA technology since narrower/smaller structures can be formed.

DETAILED DESCRIPTION

Figure 1:
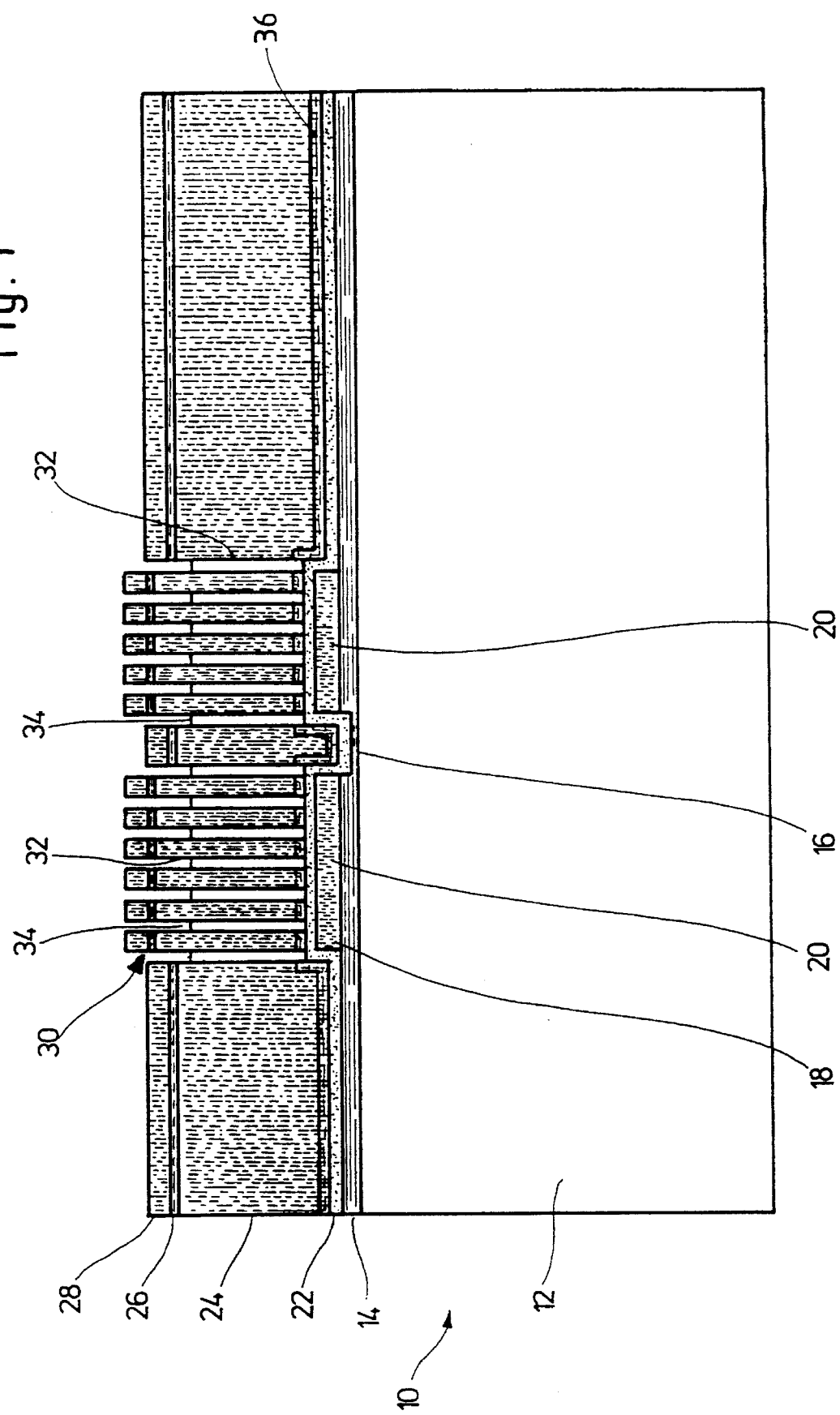
FIG. 1 shows a sectional view of a semiconductor component provided with a micromechanical structure according to the present invention.

FIG. 1 shows a semiconductor component which is generally denoted by 10 and which has a silicon wafer 12, which may also contain integrated electronic circuits, which are not shown here. The wafer 12 is provided with a standard IC passivation 14, which is interrupted as usual in the vicinity of one or more contact pads 16. The contact pad 16 is an electrically conducting connection between the electronic circuit integrated in the wafer 12 and the sensor elements to be provided subsequently.

Figure 2:
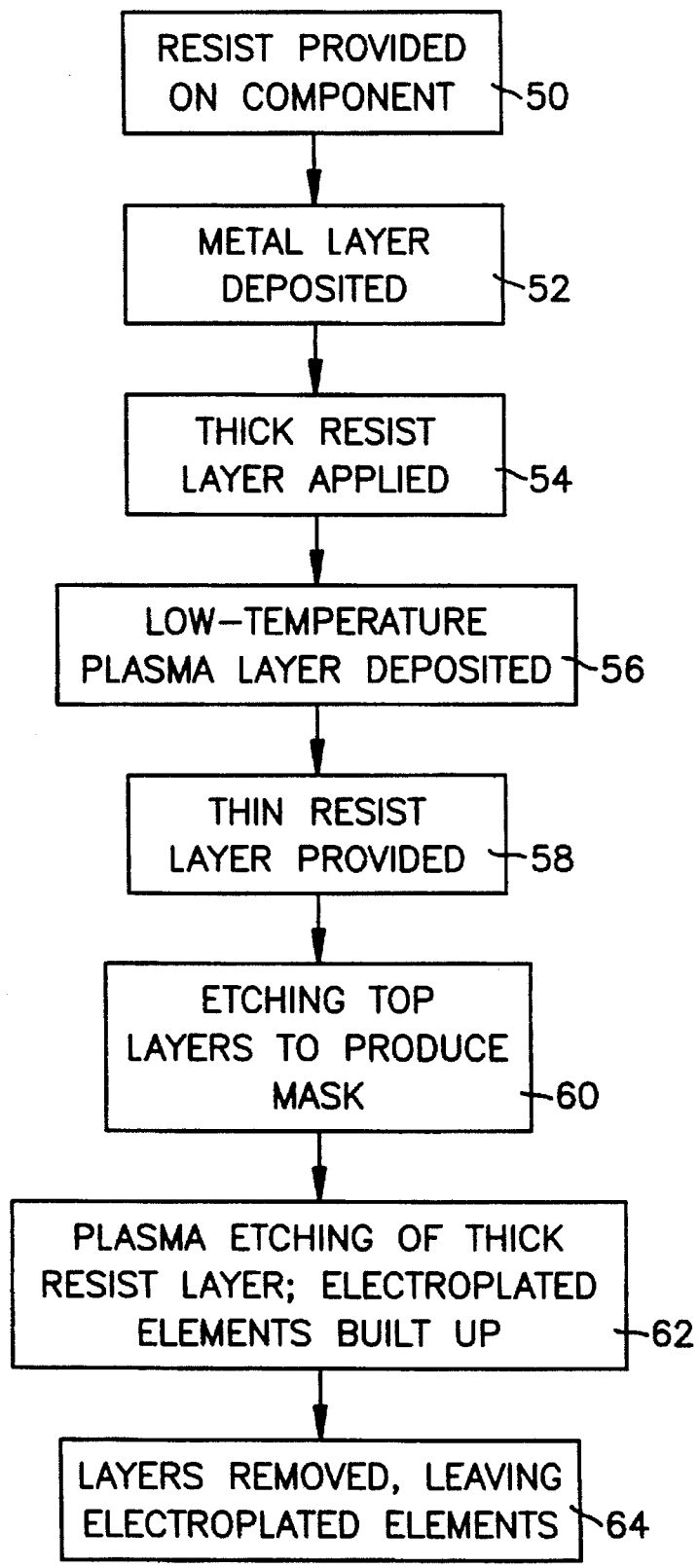
FIG. 2 shows a flow chart of a method of producing the semiconductor component shown in FIG. 1, according to the present invention.

In a step 50 of the method (illustrated in FIG. 2), a layer 18 of a resist, for example a transparent photoresist, is provided, for example spun-on, on the semiconductor component 10 and patterned photolithographically, with the result that only areas 20 of the layer 18 are left. In this process, the areas 20 are left at the points at which no contact of a metal layer to be provided subsequently, which serves as a plating base, with the surface of the wafer 12 is desired. The areas 20 are marked by a mask and the layer 18 lithographed accordingly. In connection with the masking, care has to be taken that the contact pads 16 are left free, that is to say a layer 18 must not be left on top of the latter. The areas 20 left are then heat-treated, for example cured at approximately 200° C.

In a second step 52 of the method, a metal layer 22 which covers the entire surface of the wafer 12 is deposited on top of the wafer 12. The metal layer 22 is, for example, sputtered on. In this process, the metal layer 22 adapts to the topography established by the areas 20 and the sensor contact pads 16 and accordingly spans these areas completely. The metal layer 22 forms an electrically conducting connection to the sensor contact pads 16 and is consequently at the same time the electrical connection of the sensor elements to be provided.

In a subsequent step 54 of the method, a comparatively thick layer 24 of resist, for example transparent photoresist, is applied to the metal layer 22. The layer 24 may also be provided by spinning-on; if necessary, by spinning on several times in succession until a desired layer thickness is reached. The layer thickness depends on the height of the sensor elements to be provided later and is, for example, approximately 10 to 20 pm. The layer 24 is then heat-treated and cured, for example at a temperature of approximately 200° C.

In a fourth step 56 of the method, a low-temperature plasma layer 26, for example a thin plasma oxide or plasma nitride layer, is deposited on the layer 24. The layer 26 is deposited in a thickness of 200 nm to 500 nm, for example at a deposition temperature of approximately 200° C. In a succeeding step 58 of the method, a thin layer 28 of a resist, for example a transparent photoresist, is provided on top of the low-temperature plasma layer 26.

The layer 28 is exposed with the aid of a mask in order to define the future areas of the sensor elements. This exposure of the layer 28 is carried out in an aligned process and is assisted in a simple way by the transparency of the layers 24, 26 and 28 provided, thereby making possible a precise alignment on the wafers 12. The alignment on the wafers 12 is made possible by the visible areas of the contact pads 16 and also by the clearly defined topographical differences of the areas 20. In addition, further alignment structures, for example alignment crosses, present on the semiconductor component may also be used.

After the exposure of the layer 28, the exposed areas are laid bare by development in a succeeding step 60 of the method, and a suitable mask 30 for the future sensor element is produced by etching the layer 26 into the layer 28 down to the layer 24. In the exemplary embodiment shown in FIG. 1, the future sensor element comprises a comb-like structure having a multiplicity of intermeshing fingers having vertical side walls.

In a succeeding step 62 of the method, the layer 24 is etched through down to the metal layer 22 with the aid of a plasma etching process, the mask 30 produced previously in the layers 26 and 28 being used. The plasma etching process is carried out, for example, as a high-rate plasma etching process using a high-density plasma source, for example of the ECR, PIE, ICP or Helicon type. In this connection, very high etching rates and a high anisotropy can be achieved in the case of an ion-assisted etching with high ion density, with the result that the patterning of the areas which later yield the sensor element can be carried out with high precision. The etching gases used are, for example, a mixture of argon Ar and oxygen $O_2$, in particular a mixture of 150 sccm of argon with 50 sccm of oxygen at a pressure of, for example, 10 μbar. In addition, a small proportion of gases containing fluorine, for example SF, CF, C2F, CEF3 etc., may be added in order, as a "scavenger", to keep sputtered mask material volatile in the gas phase and prevent its deposition in the trenches of the structure.

An isotropic component of the process, that is to say a lateral back-etch of the mask 30, is reduced by adjusting or by increasing the ion density and the ion energy during the plasma etching and/or by reducing the temperature of the wafer 12 during the etching. As a result of this, it is possible to increase the structural precision further. At the same time, the lateral resolution can be increased, that is to say the minimum possible spacing between two adjacently situated structural areas of the future sensor element can be reduced.

During this etching process, vertically extending trenches, canyons, holes or the like (structures 32) indicated in FIG. 1 are produced by patterning in the layer 24. In this process, the structures 32 are etched down to the metal layer 22, with the result that the latter is exposed in the areas etched out. At the same time, the upper resist layer 28 is completely etched away during the etching process.

The structures 32 produced form a female mold for the future sensor element and are filled by electroplating up to a desired height in a succeeding step 62 of the method. In this process, electroplated elements 34 which are connected to the metal layer 22 are built up in the structures 32.

In a further step 64 of the method, the remaining mask layer 26 is removed and the layer 24 is dissolved, for example dry-ashed in an °2 plasma. The metal layer 22 is etched away in the areas in which no electroplated elements 34 are present. Finally, the areas 20 underneath the metal layer 22 connected to the electroplated elements 34 are removed, for example ashed, and consequently serve as so-called sacrificial-layer areas. After the removal of all the layers originally needed for patterning the structures 32 or for building-up the electroplated elements 34 has been completed, the sensor element formed by the electroplated elements or the remaining metal layer 22 connected to the latter is laid bare.

In the example shown in FIG. 1, the sensor element forms a comb-like structure, but it may have any other desired form. The sensor element created is connected to the integrated electronic circuit in the wafer 12 via those areas of the metal layer 22 which are contacted by the sensor contact pads 16. In total, consequently, a sensor element can be provided at any desired point in any desired geometry using simple, modified method steps which are in principle already used in the production of integrated circuits in the wafers 12, without the process of providing the sensor element being directly coupled to the process of producing the integrated circuit. A mutual interaction is consequently largely eliminated.

If the sensor elements created are formed, for example, by large-area structural areas of the structures 32, for example in the case of seismic masses, it is advantageous if a perforation is created in the seismic masses by the method steps described of etching and patterning, and these are transferred to the metal layer 22, with the result that the areas 20 left underneath the metal layer 22 can be ashed substantially more rapidly through the openings of the perforation. The perforations are accordingly simply provided in the mask 30 without additional effort. Consequently, it is possible to accelerate this method step, it being possible at the same time to reduce further potential negative effects of an extremely long ashing on the wafers 12 and the integrated electronic circuits they contain.

According to a further exemplary embodiment, which is not shown, it is possible to eliminate the building-up of the areas 20 in accordance with the method step 50 if the metal layer 22 is provided during the method step 52 in such a way that it has a thickness suitable for making it possible to etch the portions formed by the areas 20 in the example shown out of the metal layer 22 in a time-controlled manner. A selective underetching of the metal layer 22 takes place, as it were, for a set time under the electroplated elements 34 created, with the result that the latter are correspondingly laid bare. This tunnel-like underetching has to be carried out in such a way that, although the sensor elements are laid bare, their attachment to the remaining metal layer 22 is not endangered. In this process, a perforation of the electroplated elements 34 deposited, which yield the future sensor element, is also advantageously carried out. With regard to a material selection, the metal layer 22 should be matched in this connection to the material of the contact pads 16 and the electroplated elements 34 so that a selective underetching can be carried out without attacking the sensor contact pads 16 or, the electroplated elements 34. A disadvantage of this variant is the direct large-area contact of the metallic layer 22 (plating base) with the IC surface.

According to a further exemplary embodiment, provision is made for providing, on top of the metal layer 22, a thin low-temperature plasma layer 36, for example a plasma oxide layer or a plasma nitride layer (shown by a broken line in FIG. 1), on which the layer 24 is then correspondingly provided. This prevents having to overetch in etching through the layer 24 on the metal layer 22. As a result of overetching of the metal layer 22, there is the risk of the plasma etching installation being contaminated by metal which has been sputtered off. The interlayer 36 ensures that overetching is carried out instead on the neutral plasma oxide layer or plasma nitride layer 36, which can then be removed again, for example, by wet-chemical means.

The present invention is not limited to the exemplary embodiment shown, but is, of course, applicable in the case of any desired semiconductor component 10, which may contain both passive and active structures. As a result of building up sensor structures on top of electronic circuit areas, the wafer surface can be used repeatedly so that suitable sensor elements can be mounted directly on the circuits provided. As a result of this, the area requirement for each chip produced from the wafers 12 is considerably reduced and the usefulness therefore increased.

What is claimed is:

1. A method of producing a micromechanical structure, comprising the steps of:
   providing at least one semiconductor component containing integrated circuits and having at least one surface;
   subsequently and independently producing the micromechanical structure on the surface of the semiconductor component;
   providing a first resist layer on the semiconductor component;
   patterning, in the first resist layer, of at least one sacrificial area using at least one protective mask area;
   providing a metal layer on the semiconductor component and on the at least one sacrificial area;
   providing a second resist layer on the metal layer, the second resist layer having a thickness at least as large as a height of the micromechanical structure and removing the at least one sacrificial area.

2. The method according to claim 1, further comprising the step of providing a second plasma CVD layer at a low temperature, at approximately 200° C., on the second resist layer.

3. The method according to claim 2, further comprising the step of providing a third resist layer on the second plasma CVD layer.

4. The method according to claim 3, further comprising the step of producing a mask corresponding to the micromechanical structure in the third resist layer and in the second plasma CVD layer.

5. The method according to claim 4, further comprising the steps of:
   patterning the second resist layer in accordance with the mask to form trenches;
   filling the trenches by electroplating to produce the micromechanical structure.

6. The method according to claim 5, further comprising the step of at least partially removing at least one of the second plasma CVD layer, the second and third resist layers, and the metal layer, using at least one of etching, ashing, and dissolving.

7. The method according to claim 6, further comprising the step of providing perforations in the micromechanical structure, the perforations being transferred into the metal layer.

8. A method of producing a micromechanical structure, comprising the steps of:
   providing at least one semiconductor component containing integrated circuits and having at least one surface;
   subsequently and independently producing the micromechanical structure on the surface of the semiconductor component;
   providing a first resist layer on the semiconductor component;
   patterning, in the first resist layer, of at least one sacrificial area using at least one protective mask area;
   providing a metal layer on the semiconductor component and on the at least one sacrificial area;
   providing a first plasma CVD layer at a low temperature, at approximately 200° C., on the metal layer;
   providing a second resist layer on the first plasma CVD layer, the second resist layer having a thickness at least as large as a height of the micromechanical structure;
   providing a second plasma CVD layer at the low temperature on the second resist layer;
   providing a third resist layer on the second plasma CVD layer;
   producing a mask corresponding to the micromechanical structure in the third resist layer and in the second plasma CVD layer;
   patterning the second resist layer and the first plasma CVD layer in accordance with the mask to form trenches;
   filling the trenches by electroplating to produce the micromechanical structure;
   at least partially removing at least one of the first and second plasma CVD layers, the second and third resist layers, and the metal layer, using at least one of etching, ashing, and dissolving; and
   removing the at least one sacrificial area.

9. The method according to claim 8, further comprising the step of providing perforations in the micromechanical structure, the perforations being transferred into the metal layer.

* * * * *